United States Patent
Cochell et al.

(10) Patent No.: US 11,144,652 B1
(45) Date of Patent: Oct. 12, 2021

(54) SECURE UPDATE OF PROGRAMMABLE INTEGRATED CIRCUITS IN DATA CENTER COMPUTING ENVIRONMENTS

(71) Applicant: Xilinx, Inc., San Jose, CA (US)

(72) Inventors: Ellery Cochell, Sunnyvale, CA (US); Brian S. Martin, Longmont, CO (US); Ravi N. Kurlagunda, Fremont, CA (US)

(73) Assignee: Xilinx, Inc., San Jose, CA (US)

( * ) Notice: Subject to any disclaimer, the term of this patent is extended or adjusted under 35 U.S.C. 154(b) by 107 days.

(21) Appl. No.: 16/721,550

(22) Filed: Dec. 19, 2019

(51) Int. Cl.
| | |
|---|---|
| *G06F 21/60* | (2013.01) |
| *G06F 21/79* | (2013.01) |
| *H04L 9/08* | (2006.01) |
| *H04L 29/06* | (2006.01) |
| *G06F 21/57* | (2013.01) |

(52) U.S. Cl.
CPC .......... *G06F 21/602* (2013.01); *G06F 21/575* (2013.01); *G06F 21/79* (2013.01); *H04L 9/0894* (2013.01); *H04L 63/0435* (2013.01); *H04L 63/0823* (2013.01)

(58) Field of Classification Search
CPC ...... G06F 21/602; G06F 21/575; G06F 21/79; H04L 63/0823; H04L 63/0435; H04L 9/0894
See application file for complete search history.

(56) References Cited

U.S. PATENT DOCUMENTS

| | | | | |
|---|---|---|---|---|
| 5,850,151 | A * | 12/1998 | Cliff | H03K 19/17764 326/39 |
| 6,025,737 | A * | 2/2000 | Patel | H03K 19/0027 326/68 |
| 6,246,260 | B1 * | 6/2001 | Mendel | H03K 19/17704 326/39 |
| 6,493,862 | B1 * | 12/2002 | Young | G06F 30/34 716/117 |
| 6,526,557 | B1 * | 2/2003 | Young | H03K 19/17756 326/38 |
| 6,957,340 | B1 * | 10/2005 | Pang | G06F 21/76 326/38 |
| 7,058,177 | B1 * | 6/2006 | Trimberger | H04L 9/08 380/28 |
| 7,117,373 | B1 * | 10/2006 | Trimberger | G06F 21/76 713/193 |

(Continued)

OTHER PUBLICATIONS

Adam Duncan, FPGA Bitstream Security: A Day in the Life, 2019 IEEE International Test Conference (ITC) pp. 1-10 (Year: 2019).*

(Continued)

*Primary Examiner* — Shahriar Zarrineh
(74) *Attorney, Agent, or Firm* — Kevin T. Cuenot

(57) ABSTRACT

Secure updating of programmable integrated circuits includes receiving, within the programmable integrated circuit, a configuration bitstream, inserting, using a processor of the programmable integrated circuit, a key into the configuration bitstream resulting in a modified configuration bitstream, encrypting, using the programmable integrated circuit, the modified configuration bitstream using the key resulting in an encrypted configuration bitstream, and storing the encrypted configuration bitstream in a boot memory for the programmable integrated circuit.

12 Claims, 6 Drawing Sheets

(56) References Cited

U.S. PATENT DOCUMENTS

| | | | | |
|---|---|---|---|---|
| 7,143,384 | B1 * | 11/2006 | Young | G06F 30/394 716/128 |
| 7,240,218 | B2 * | 7/2007 | Kean | G06F 12/1408 711/E12.092 |
| 7,385,532 | B1 * | 6/2008 | Schumacher | H04N 19/70 341/1 |
| 7,424,658 | B1 * | 9/2008 | Ghosh Dastidar | G01R 31/318555 714/738 |
| 7,606,362 | B1 * | 10/2009 | Streicher | H04L 9/0822 380/29 |
| 7,725,738 | B1 * | 5/2010 | Langhammer | G06F 21/60 713/191 |
| 7,747,025 | B1 * | 6/2010 | Trimberger | G09C 1/00 380/284 |
| 7,788,502 | B1 * | 8/2010 | Donlin | G06F 21/76 713/189 |
| 7,856,546 | B2 * | 12/2010 | Casselman | G06F 13/409 712/43 |
| 8,022,724 | B1 * | 9/2011 | Jenkins, IV | H03K 19/177 326/38 |
| 8,438,436 | B1 * | 5/2013 | Baker | G01R 31/318588 714/726 |
| 8,539,254 | B1 * | 9/2013 | Bridgford | H04L 67/34 713/194 |
| 8,576,641 | B1 * | 11/2013 | Trimberger | G11C 7/22 365/189.15 |
| 8,966,253 | B1 * | 2/2015 | Trimberger | H04L 63/123 713/168 |
| 8,983,073 | B1 * | 3/2015 | Peterson | G06F 21/629 380/277 |
| 9,054,859 | B1 * | 6/2015 | Streicher | H04L 9/065 |
| 9,218,505 | B1 * | 12/2015 | Wesselkamper | G06F 21/755 |
| 9,270,274 | B1 * | 2/2016 | Reese | H03K 19/017581 |
| 9,722,613 | B1 * | 8/2017 | Schultz | H03K 19/17728 |
| 10,031,760 | B1 * | 7/2018 | Santan | G06F 9/44505 |
| 10,044,514 | B1 * | 8/2018 | Peterson | H04L 9/0894 |
| 10,305,511 | B1 * | 5/2019 | Schultz | H03M 7/46 |
| 10,489,609 | B1 * | 11/2019 | McGrath | G06F 21/75 |
| 2002/0199110 | A1 * | 12/2002 | Kean | G06F 21/76 713/189 |
| 2004/0181686 | A1 * | 9/2004 | Krause | H04L 12/66 726/30 |
| 2007/0288765 | A1 * | 12/2007 | Kean | G06F 21/76 713/193 |
| 2013/0159725 | A1 * | 6/2013 | Koo | G06F 21/76 713/189 |
| 2017/0155510 | A1 * | 6/2017 | Cloostermans | H04L 9/3093 |
| 2018/0082083 | A1 * | 3/2018 | Smith | G06F 21/575 |
| 2018/0232254 | A1 * | 8/2018 | Mohan | G06F 3/0647 |
| 2020/0153623 | A1 * | 5/2020 | Asanghanwa | H04L 67/10 |
| 2021/0042252 | A1 * | 2/2021 | Thyamagondlu | G06F 13/28 |

OTHER PUBLICATIONS

Xilinx, "Bitstream Security, eFUSEs, and Device DNA," Chap. 8 of UltraScale Architecture Configuration, User Guide, UG570 (v1.10), 16 pg., Feb. 21, 2019, Xilinx, Inc., San Jose, CA, USA.

* cited by examiner

SECURE UPDATE OF PROGRAMMABLE INTEGRATED CIRCUITS IN DATA CENTER COMPUTING ENVIRONMENTS

TECHNICAL FIELD

This disclosure relates to securely updating programmable integrated circuits within data center computing environments.

BACKGROUND

Hardware used within a data center must be sufficiently robust to withstand attacks from malicious actors. The ability to withstand an attack applies not only to the computers (e.g., servers), but also to the peripheral devices connected to the computers. For example, in the case where a programmable integrated circuit (IC) is used as a peripheral device or as part of a peripheral device of a computer, any configuration data loaded into the programmable IC should be authenticated to ensure that the configuration data was generated by a trusted source.

Programmable ICs often include built in circuitry capable of authenticating configuration data. In some cases, using this circuitry limits the availability of certain other functionality of the programmable IC. For example, utilizing the built in authentication circuitry in some programmable ICs may prevent the use of features such as tandem boot, configuration bitstream compression, and/or partial reconfiguration. These features, however, are either necessary or heavily relied upon by many data centers.

Typically, a programmable IC is part of a peripheral device that communicates with a host computer via a communication bus such as, for example, Peripheral Component Interconnect Express (PCIe). PCIe peripherals are required to boot in under 100 ms. One or more of the features noted above, e.g., tandem boot and/or configuration bitstream compression, are used to reduce the boot time of a programmable IC so that the device may boot in less than the maximum allowed boot time for a PCIe peripheral device. Partial reconfiguration also is heavily utilized in data centers as partial reconfiguration allows programmable ICs to be dynamically reconfigured based on the particular application to be accelerated at any given time.

SUMMARY

In one aspect, a method can include receiving, within a programmable integrated circuit (IC), a configuration bitstream, inserting, using a processor of the programmable IC, a key into the configuration bitstream resulting in a modified configuration bitstream, encrypting, using the programmable IC, the modified configuration bitstream using the key resulting in an encrypted configuration bitstream, and storing the encrypted configuration bitstream in a boot memory for the programmable IC.

In another aspect, an IC can include a communication bus interface configured to receive a configuration bitstream and a processor configured to insert a key into the configuration bitstream resulting in a modified configuration bitstream. The processor is further configured to encrypt the modified configuration bitstream using the key resulting in an encrypted configuration bitstream. The IC also can include a memory controller configured to store the encrypted configuration bitstream in a boot memory for the IC.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
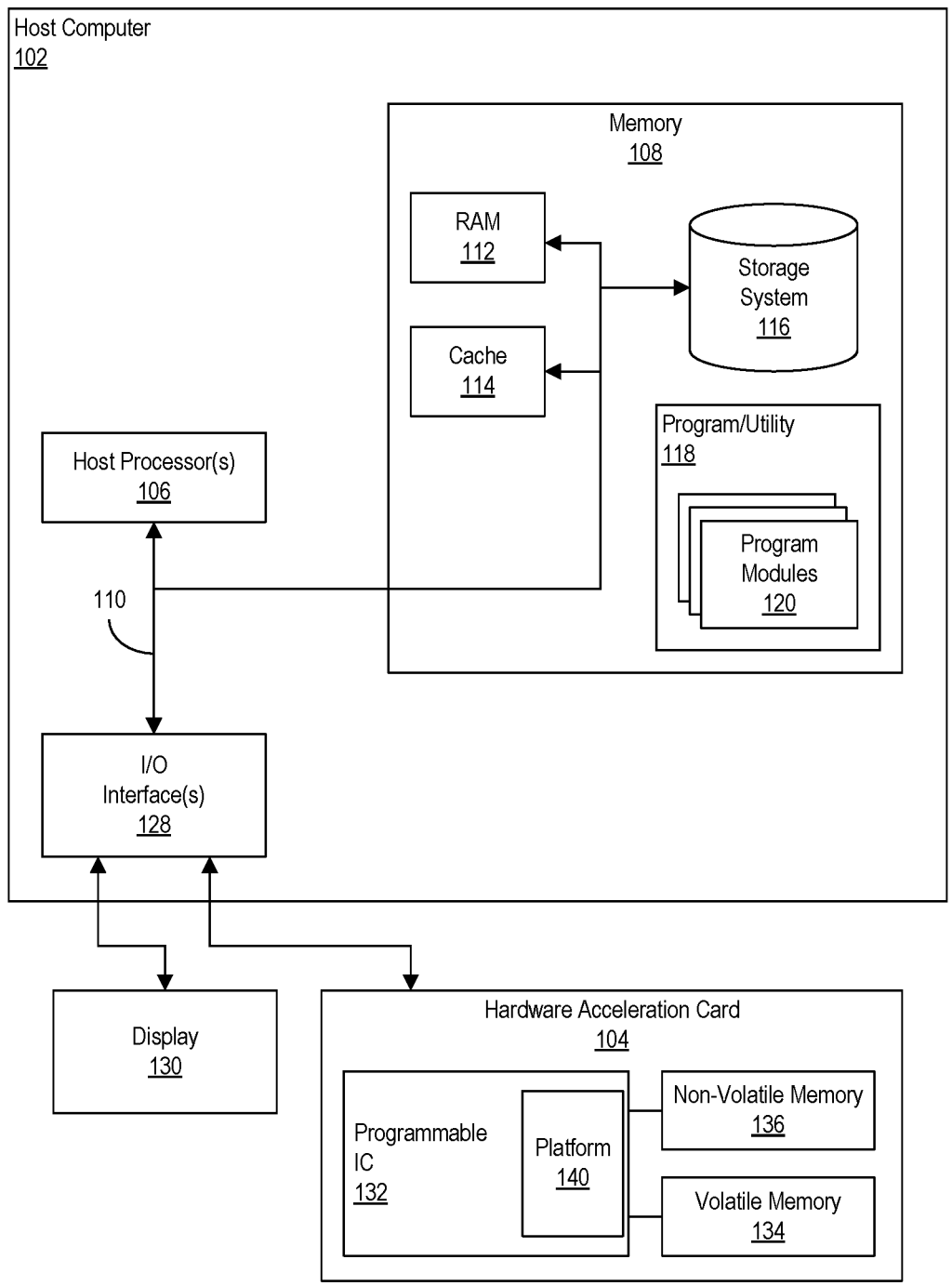
FIG. 1 illustrates an example computing environment for use with the inventive arrangements described within this disclosure.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to securely updating programmable integrated circuits (ICs) within data center computing environments. Data center users expect that data stored in the data center will be securely maintained. Users also expect the data center hardware to be operational most, if not all, of the time. To meet these requirements, the data center hardware must be robust and able to withstand malicious attacks. This robustness applies not only to the computers, but also to the peripheral devices coupled to the computers.

Programmable ICs such as Field Programmable Gate Arrays (FPGAs) provide significant benefits in that the devices may be reprogrammed to adapt to many different applications and system architectures. The flexibility of programmable ICs also means that the devices may be susceptible to hijack or tampering such as where compromised configuration bitstreams are provided to the devices. A configuration bitstream that has been maliciously altered used in place of a trusted configuration bitstream, when loaded into the programmable IC, may cause physical damage to the programmable IC, tamper with a running design, attack a network and/or host computer, or expose confidential customer intellectual property. For these reasons, reducing or eliminating the ability of a nefarious actor to gain control over the programmable IC is of utmost importance.

Some programmable ICs provide built in circuitry capable of performing authentication on received configuration bitstreams to ensure the configuration bitstream is from a trusted source. An example is Rivest-Shamir-Adleman (RSA) enabled authentication circuitry which uses asymmetric keys. The public key used for authentication is stored on the programmable IC. The private key used to create the authentication signature, which is different from the public key, is held by a trusted third party such as the creator or manufacturer of the programmable IC. RSA authentication provides benefits such as ensuring that the configuration data downloaded to the programmable IC has not been tampered with. The programmable IC does not load the configuration data unless the RSA authentication circuitry indicates that the configuration data is from a trusted (e.g., an authenticated) source.

Using the built in RSA authentication circuitry of some programmable ICs, however, renders certain other circuitry and/or features of the programmable IC unavailable. For example, when using RSA authentication circuitry in some programmable ICs, tandem boot, configuration bitstream compression, and partial reconfiguration are unavailable in some programmable ICs. As discussed, tandem boot and configuration bitstream compression are often used so that the programmable IC is capable of implementing a PCIe controller capable of processing data traffic no later than 100 ms after power on. Partial reconfiguration is used to support dynamic workloads in many data centers.

In accordance with the inventive arrangements described within this disclosure, example circuit architectures are described that use symmetric encryption to provide a level of security that is the same as, or comparable to, RSA authentication security. The example circuit architectures described herein use Advanced Encryption Standard (AES) encryption in combination with Galois/Counter mode (GCM) authentication. By using the example circuit architectures described herein in lieu of the built in RSA authentication circuitry, features upon which data centers have come to rely remain available within the programmable IC. Flexibility of the programmable IC is maintained. For example, the inventive arrangements are capable of providing RSA level authentication using AES-GCM while maintaining the availability of features such as tandem boot, configuration bitstream compression, and/or partial reconfiguration. The inventive arrangements are also capable of performing "in field" updates of firmware for the programmable ICs.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example computing environment 100 for use with the inventive arrangements described within this disclosure. The computing environment includes a host computer 102 coupled to a hardware acceleration card 104. Computing environment 100 is representative of a data center. An actual data center may include more host computers than shown wherein one or more or all of the host computers has one or more of acceleration cards 104 as shown.

A data center refers to a dedicated space such as a room or building that houses computing facilities such as, for example, servers, routers, switches, firewalls, telecommunications equipment, and/or storage systems. The data center often includes supporting components like backup equipment, fire suppression facilities, and air conditioning. A data center may be private or shared. Typically, the data center restricts access to the computing hardware to only authorized personnel.

The components of host computer 102 may include, but are not limited to, one or more host processors 106 (e.g., central processing units), a memory 108, and a bus 110 that couples various system components including memory 108 to host processor(s) 106. Host processor(s) 106 may include any of a variety of processors that are capable of executing program code. Example processor types include, but are not limited to, processors having an x86 type of architecture (IA-32, IA-64, etc.), Power Architecture, ARM processors, and the like.

Bus 110 represents one or more of any of several types of communication bus structures, including a memory bus or memory controller, a peripheral bus, an accelerated graphics port, and a processor or local bus using any of a variety of available bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Host computer 102 typically includes a variety of computer readable media. Such media may be any available media that is accessible by host computer 102 and may include any combination of volatile media, non-volatile media, removable media, and/or non-removable media.

Memory 108 may include computer readable media in the form of volatile memory, such as random-access memory (RAM) 112 and/or cache memory 114. Host computer 102 may also include other removable/non-removable, volatile/non-volatile computer system storage media. By way of example, storage system 116 may be provided for reading from and writing to a non-removable, non-volatile magnetic and/or solid state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 110 by one or more data media interfaces. Memory 108 is an example of at least one computer program product having a set (e.g., at least one) of program modules (e.g., program code) configured to carry out the functions and/or operations described within this disclosure.

For example, program/utility 118 includes a set (at least one) of program modules 120. Program modules 120, being stored in memory 108, may include, but are not limited to, an operating system, one or more application programs (e.g., user applications), other program modules, and/or program data. Program modules 120 generally carry out the functions and/or methodologies as described herein at least with respect to operations performed by host computer 102. For example, program modules 120 may implement a software stack. The software stack may implement a runtime environment capable of performing the host computer 102 operations described herein. In one aspect, program modules 120 includes a driver or daemon capable of communicating with programmable IC 132.

Program/utility 118 is executable by host processor(s) 106. Program/utility 118 and any data items used, generated, and/or operated upon by host processor(s) 106 are functional data structures that impart functionality when employed by host processor(s) 106. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Host computer 102 may include one or more Input/Output (I/O) interfaces 128 communicatively linked to bus 110. I/O interface(s) 128 allow host computer 102 to communicate with external devices, couple to external devices that allow user(s) to interact with host computer 102, couple to external devices that allow host computer 102 to communicate with other computing devices, and the like. For example, host computer 102 may be communicatively linked to a display 130 and to hardware acceleration card 104 through I/O interface(s) 128. Host computer 102 may be coupled to other external devices such as a keyboard (not shown) via I/O interface(s) 128. Examples of I/O interfaces 128 may include, but are not limited to, network cards, modems, network adapters, hardware controllers, etc.

In an example implementation, the I/O interface 128 through which host computer 102 communicates with hardware acceleration card 104 is a PCIe adapter. Hardware acceleration card 104 may be implemented as a circuit board that couples to host computer 102. Hardware acceleration card 104 may, for example, be inserted into a card slot, e.g., an available bus and/or PCIe slot, of host computer 102.

Hardware acceleration card 104 includes a programmable IC 132. Hardware acceleration card 104 also includes volatile memory 134 coupled to programmable IC 132 and a non-volatile memory 136 also coupled to programmable IC 132. Volatile memory 134 may be implemented as a RAM that is external to programmable IC 132, but is still considered a "local memory" of programmable IC 132, whereas memory 108, being within host computer 102, is not considered local to programmable IC 132. Non-volatile memory 136 may be implemented as flash memory. Non-volatile memory 136 is also external to programmable IC 132 and may be considered local to programmable IC 132.

Hardware acceleration card 104 usually provides improved performance compared to performing a task using host processor(s) 106. For a device such as programmable IC 132, a task that would otherwise be performed by host processor(s) 106 executing program code is performed by a circuit design that is implemented within programmable IC 132. The circuit design implemented in programmable IC 132 typically provides one or more benefits that are not attainable through execution of functionally equivalent program code using a processor. Examples of the benefit(s) may include faster operation, reduced power consumption, and/or redundancy. Despite the fact that the benefits may or may not include faster operation, the process of performing a task or operation in hardware that would otherwise be performed by a processor executing program code is referred to as "hardware acceleration."

Programmable IC 132 includes programmable circuitry (e.g., programmable logic). It should be appreciated that, while not explicitly shown, programmable IC 132 may include one or more hardwired circuit blocks that may be used in cooperation with the programmable circuitry. Examples of such circuit blocks may include, but are not limited to, built in RSA authentication circuitry and a decryption engine.

Programmable IC 132 is initially loaded with a trusted configuration bitstream that implements a platform 140 therein. In general, platform 140 is implemented using programmable circuitry of programmable IC 132. Platform 140 is capable of performing a variety of different functions. For example, platform 140 couples programmable IC 132 to host computer 102 and to the various other circuits disposed on hardware acceleration card 104 (e.g., non-volatile memory 136 and/or volatile memory 134). Platform 140 is also capable of coupling programmable IC 132 to one or more external networks (not shown). Platform 140 further establishes connectivity between user circuit designs implemented in other portions of the programmable circuitry therein, host computer 102, and/or other components of hardware acceleration card 104.

Platform 140, being implemented by loading a trusted (e.g., authenticated) configuration bitstream, is considered firmware of programmable IC 132. The trusted configuration bitstream may also be considered firmware of hardware acceleration card 104, though, for purposes of description, the trusted configuration bitstream is generally referred to herein as firmware of programmable IC 132. The firmware that implements platform 140 may be loaded into programmable IC 132 and/or hardware acceleration card 104 (e.g., into non-volatile memory 136) at the time of manufacture of programmable IC 132 or at the time of manufacture of hardware acceleration card 104. In this regard, hardware acceleration card 104 and/or programmable IC 132 may be pre-loaded with platform 140 at the time that hardware acceleration card 104 and/or programmable IC 132 is provided to users (e.g., customers). The foregoing are provided for purposes of illustration and not limitation. As such, the particular way in which the initial authenticated firmware is loaded into programmable IC 132 and/or hardware acceleration card 104 is not intended as a limitation of the inventive arrangements described herein.

The inventive arrangements described within this disclosure provide example techniques and/or circuit structures that are capable of updating the firmware of programmable IC 132 while in the field. That is, the firmware of programmable IC 132 may be updated while programmable IC 132 is used as a peripheral device or as part of a peripheral device of a host computer within a data center.

FIG. 1 is not intended to suggest any limitation as to the scope of use or functionality of the examples described herein. Host computer 102 is an example of computer hardware (e.g., a system) that is capable of performing the various operations described within this disclosure relating to hardware acceleration card 104 and/or programmable IC 132.

Host computer 102 is only one example implementation of a computer that may be used with a hardware acceleration card. Host computer 102 is shown in the form of a computing device, e.g., a computer or server. Host computer 102 can be practiced within a data center. For example, host computer 102 may be practiced as a standalone device, as a bare metal server, in a cluster, or in a distributed cloud computing environment. In a distributed cloud computing environment, tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

Some computing environments, e.g., cloud computing environments, edge computing environments, and/or data centers, generally support the FPGA-as-a-Service (FaaS) model. In the FaaS model, user functions are hardware accelerated as circuit designs implemented within programmable ICs operating under control of the host computer. Other examples of cloud computing models are described in the National Institute of Standards and Technology (NIST) and, more particularly, the Information Technology Laboratory of NIST.

Host computer 102 is operational with numerous other general-purpose or special-purpose computing system environments or configurations. Examples of computing systems, environments, and/or configurations that may be suitable for use with host computer 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 2:
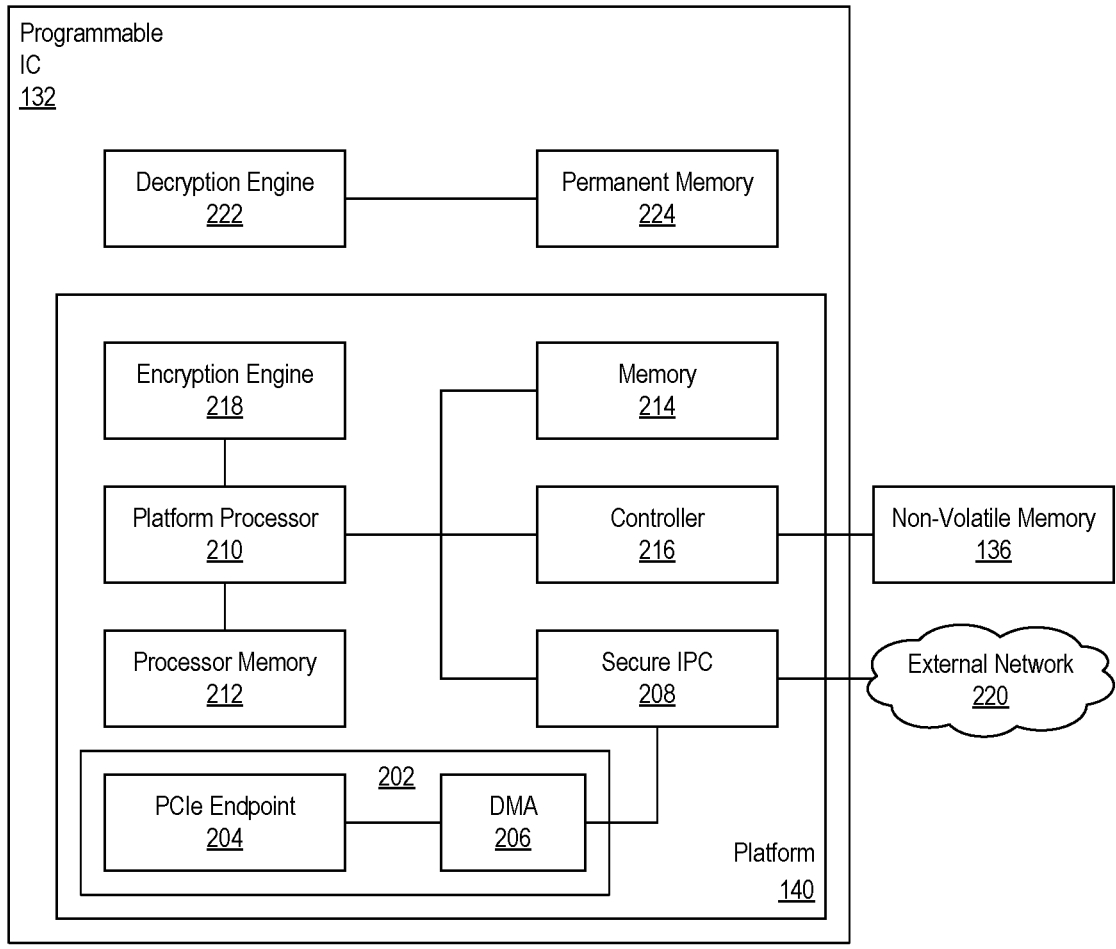
FIG. 2 illustrates an example implementation of a platform for a programmable integrated circuit (IC).

FIG. 2 illustrates an example implementation of platform 140. In the example of FIG. 2, platform 140 includes a communication bus interface 202 that is capable of communicating with host computer 102. Communication bus interface 202 may include a PCIe endpoint 204 connected to a direct memory access (DMA) circuit 206. PCIe endpoint 204 is capable of communicating with host computer 102 via a PCIe connection. DMA 206 is connected to a secure inter-processor communications (IPC) circuit 208. DMA 206 is capable of writing data received via PCIe endpoint 204, e.g., from host computer 102, into secure IPC circuit 208.

Platform 140 also includes a platform processor 210, a processor memory 212, a memory 214, a controller 216, and the secure IPC circuit 208. In another example, platform 140 includes an optional encryption engine 218. If included, platform processor 210 may be connected to encryption engine 218. Platform processor 210 is also connected to processor memory 212. Platform processor 210 may also couple to memory 214, controller 216, and secure IPC circuit 208 via a bus or other on-chip interconnect.

Platform 140 is implemented in the programmable circuitry of programmable IC 132. As such, platform processor 210 is implemented as a soft-processor. Platform processor 210 is capable of executing program code (e.g., instructions) stored in processor memory 212. Processor memory 212 may be accessible by platform processor 210 exclusively. For example, processor memory 212 may be reserved and accessed solely by platform processor 210. The program code stored in processor memory 212 may be authenticated (e.g., trusted) program code that is loaded into processor memory 212 as part of the trusted configuration bitstream that implements platform 140 (e.g., as part of and/or embedded in the firmware).

Memory 214 is configured to store security data. In one aspect, memory 214 is capable of storing a key to be described in greater detail herein. Controller 216 is coupled to non-volatile memory 136. For example, controller 216 may be a flash memory controller. In one or more other examples, platform 140 may include a memory controller (not shown) that is coupled to and communicates with volatile memory 134.

In general, secure IPC circuit 208 is a memory space that may be read and/or written by platform processor 210 and another device (e.g., another processor) through an external network 220. For example, secure IPC circuit 208 may include a mailbox that supports bi-directional communication between multiple processors. The mailbox may be implemented using first-in-first-out circuits supporting bi-directional messaging. Secure IPC circuit 208 may also include a mutex that implements mutual exclusion locks allowing the processors to lock shared resources preventing multiple accesses to such resources at the same time. Secure IPC circuit 208 is "secure" in that since the trusted configuration bitstream implementing platform 140 is from a secure source, accesses and/or functionality restrictions for secure IPC circuit 208 are built into platform 140. That is, secure IPC circuit 208 may only be accessed in the ways specifically allowed by platform 140.

Encryption engine 218 is implemented in programmable logic of programmable IC 132. In one aspect, encryption engine 218 is capable of performing AES encryption. In some example implementations, encryption engine 218 is also capable of performing authentication (e.g., GCM authentication). For example, encryption engine 218 may operate under control of platform processor 210 to perform encryption and/or authentication. Encryption engine 218 is capable of performing encryption and/or authentication faster than platform processor 210 executing program code (e.g., firmware).

In another aspect, programmable IC 132 includes a decryption engine 222 implemented as hardwired circuitry, e.g., as dedicated logic. The decryption engine is capable of performing AES decryption. In one aspect, a key is stored in a non-volatile and one-time-programmable memory referred to herein as a "permanent memory" 224. In the example of FIG. 2, permanent memory 224 is internal to programmable IC 132. In another example, permanent memory 224 is disposed on hardware acceleration card 104. For example, permanent memory 224 may be an electronic fuse circuit. In one aspect, the key can only be programmed into permanent memory 224 via a particular port, e.g., JTAG, but cannot be read back. Permanent memory 224, and thus the key, may only be read by decryption engine 222.

During configuration, programmable IC 132 expects any configuration bitstream loaded therein to be encrypted using the key stored in permanent memory 224. This applies to user configuration bitstreams and to firmware (e.g., the trusted configuration bitstream that implements platform 140 or an updated version of platform 140). Within programmable IC 132, decryption engine 222 is capable of automatically performing decryption of any incoming configuration bitstream to be used to configure programmable IC 132 using the key stored in permanent memory 224. Decryption engine 222, however, cannot be used for any purpose other than configuration bitstream decryption. For example, decryption engine 222 is not available to user circuit designs and cannot be used to decrypt any data other than a configuration bitstream.

In one aspect, the security data stored by memory 214 is or includes the same key that is stored in permanent memory 224. The key, being used for AES encryption/decryption, is a symmetric key. Memory 214, unlike permanent memory 224, may be accessed by platform processor 210. In example implementations that include encryption engine 218, platform processor 210 is capable of providing the key to encryption engine 218. By storing the key in memory 214, circuit elements of platform 140, e.g., platform processor 210, are capable of reading and using the key.

In one aspect, memory 214 is implemented as one or more block random access memories (BRAMs). Memory 214 is implemented to be private to platform processor 210. For example, memory 214 may only be read by platform processor 210. In this regard, memory 214 is not readable from host computer 102 and/or another circuit block within programmable IC 132 or another entity outside of programmable IC 132.

Since the program code executing on platform processor 210 (also referred to herein as "platform processor firmware") is authenticated, the key is guaranteed not to be leaked from programmable IC 132. Platform processor 210 serves as the Root of Trust in this regard. As noted, the platform processor firmware executed by platform processor 210 may be included or embedded in the configuration bitstream that implements platform 140 within programmable IC 132.

The key programmed into permanent memory 224 and stored in memory 214 is unique to each programmable IC (e.g., unique for each hardware acceleration card). Thus, the key used to encrypt/decrypt configuration bitstreams for programmable IC 132 is not the same as the key used to encrypt/decrypt any other configuration bitstreams for other programmable ICs. While a person with local, physical access to a hardware acceleration card may be able to break into a particular hardware acceleration card to obtain this key, one would need to do so for each different hardware acceleration card (e.g., each different programmable IC) used in a given computing environment to run a given configuration bitstream on each different hardware acceleration card (or programmable IC). Given the restricted access to hardware resources within a data center, this type of local, physical access is not possible.

Since configuration bitstreams for programmable IC 132 must be encrypted to be used and the key is not known outside of programmable IC 132, to update the firmware for programmable IC 132 (e.g., provide an updated version of the trusted configuration bitstream to implement a new and/or updated version of platform 140 in the field), programmable IC 132 is used to perform the encryption of the new trusted configuration bitstream. That is, computer based design tools are unaware of the key for each different programmable IC and, as such, unable to encrypt new and/or updated trusted configuration bitstreams used as firmware for programmable IC 132.

In accordance with the inventive arrangements described herein, a configuration bitstream for a new and/or updated platform is provided to programmable IC 132 in unencrypted form. Programmable IC 132 encrypts the trusted configuration bitstream, e.g., new and/or updated firmware, and stores the resulting encrypted configuration bitstream in a boot memory for subsequent use by programmable IC 132. As part of the process, programmable IC 132 inserts the key into the configuration bitstream to ensure that the key is available to circuit components of platform 140.

In the example of FIG. 2, host computer 102 is capable of sending a configuration bitstream to programmable IC 132 for processing to be used as new and/or updated firmware. PCIe endpoint 204 receives the configuration bitstream, while DMA 206 is capable of writing the configuration bitstreams to secure IPC circuit 208 for processing. Platform processor 210 is capable of performing operations such as authentication on the received configuration bitstream thereby ensuring that the received configuration bitstream is from a trusted source. In another aspect, platform processor 210 invokes encryption engine 218 to perform authentication of the received configuration bitstream.

Platform processor 210 further is capable of encrypting the received configuration bitstream using the key stored in memory 214. In another aspect, platform processor 210 invokes encryption engine 218 to encrypt the received configuration bitstream. Platform processor 210 is capable of storing the encrypted configuration bitstream in non-volatile memory 136 via controller 216 as updated firmware. Programmable IC 132 may be rebooted or restarted at which point the encrypted configuration bitstream is loaded from non-volatile memory 136 as firmware thereby implementing a new and/or updated version of platform 140 within programmable IC 132.

Figure 3:
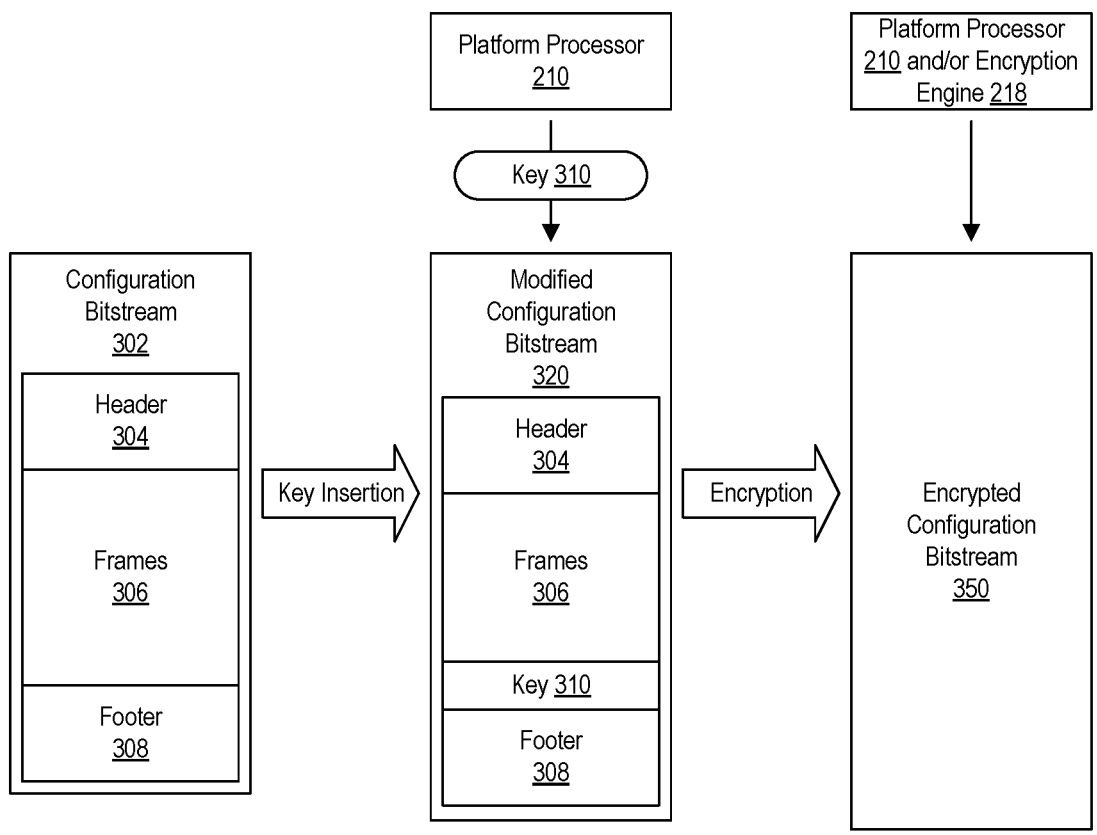
FIG. 3 illustrates an example process performed using the platform.

FIG. 3 illustrates an example process performed using platform 140. FIG. 3 begins in a state where programmable IC 132 is initially configured with platform 140. In the example, programmable IC 132 receives configuration bitstream 302 from host computer 102. For purposes of discussion, configuration bitstream 302 is a trusted configuration bitstream. Configuration bitstream 302 is intended to be used as firmware for programmable IC 132.

As shown, configuration bitstream 302 includes a header 304, one or more frames 306 that program portions of programmable circuitry in programmable IC 132, and a footer 308. Platform processor 210 inserts key 310 into configuration bitstream 302 thereby generating modified configuration bitstream 320. Key 310 is the same key stored in memory 214 (which is accessible by platform processor 210) and the same key stored in permanent memory 224. Modified configuration bitstream 320 includes key 310 therein. In one aspect, key 310 is included or written into one of the frames 306.

In one aspect, platform processor 210 inserts key 310 into configuration bitstream 302 by updating a particular location in configuration bitstream 302 corresponding to a memory such as a BRAM. Platform processor 210 updates configuration bitstream 302 so that the contents of the BRAM, when instantiated or implemented in programmable logic of programmable IC 132 as memory 214, store the key. For example, the insertion point of the key within configuration bitstream 302 corresponds to the location where contents of the particular BRAM that will store the key (e.g., memory 214) are specified within configuration bitstream 302.

After generating modified configuration bitstream 320, platform processor 210 or encryption engine 218 operating under control of platform processor 210 is capable of encrypting modified configuration bitstream 320 using key 310. Platform 140 generates encrypted configuration bitstream 350, which is the encrypted version of modified configuration bitstream 320. For example, platform processor 210, executes trusted program code (e.g., program code embedded in the firmware that implements platform 140 in programmable IC 132) to perform AES encryption. The program code may also include instructions for platform processor 210 to perform authentication (e.g., GCM authentication). In another aspect, platform processor 210 executes the trusted program code to invoke encryption engine 218 and provide key 310 to encryption engine 218 to perform the encryption. As noted, in another aspect, platform processor 210 is capable of invoking encryption engine 218 to perform the authentication of configuration bitstream 302.

Figure 4:
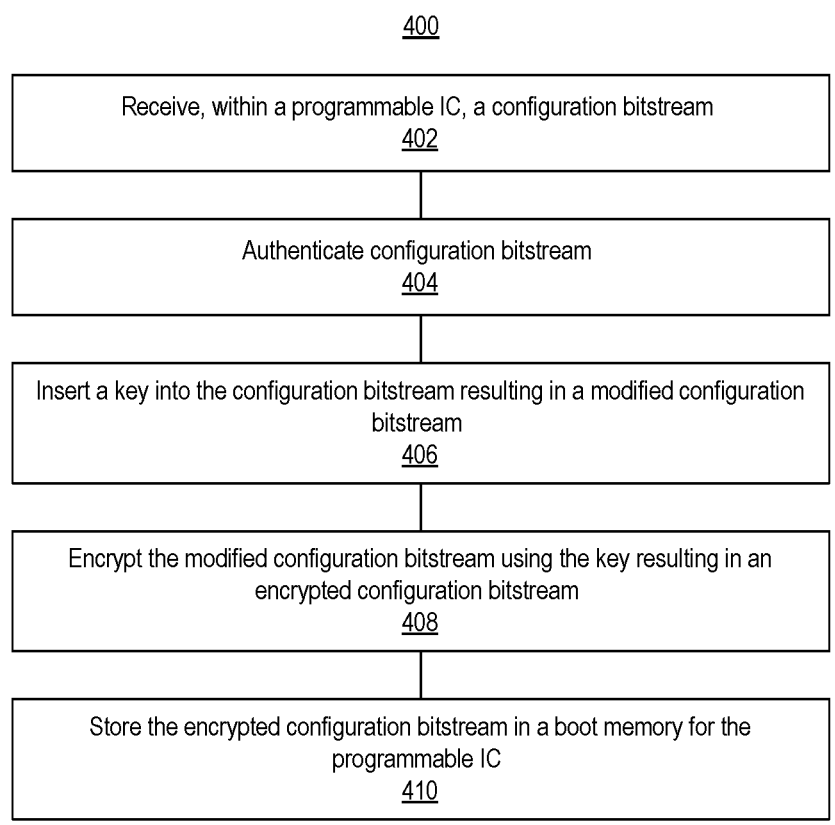
FIG. 4 illustrates an example method of generating updated firmware for a programmable IC.

FIG. 4 illustrates an example method 400 of generating updated firmware for programmable IC 132. In the example of FIG. 4, method 400 begins in a state where platform 140 has been implemented in programmable IC 132. Further, programmable IC 132, being disposed on hardware acceleration card 104, is installed as a peripheral device to host computer 102. Host computer 102 may be part of a data center.

In block 402, the programmable IC receives a configuration bitstream. The programmable IC, for example, receives a configuration bitstream from the host computer via the communication bus interface. The configuration bitstream may include a certificate that may be used for authentication. The configuration bitstream may specify an updated version of the circuitry for the platform described herein and/or updated program code for execution by the platform processor of such platform.

In block 404, the platform processor is capable of performing authentication on the received configuration bitstream using the certificate. As discussed, the platform processor is capable of executing instructions specified in the trusted program code to perform GCM authentication thereby verifying that the received configuration bitstream is from a trusted source. In another example, the platform processor is capable of invoking the encryption engine to perform the authentication using the certificate.

In block 406, the platform processor inserts a key into the configuration bitstream resulting in a modified configuration bitstream. The platform processor, for example, reads the key from memory (e.g., memory 214) and inserts a copy of the key at a particular or known location in the received configuration bitstream. The known location corresponds to a particular memory such as a BRAM. The platform processor inserts the key into the configuration bitstream so that the BRAM, when instantiated in the programmable IC as firmware to implement a new and/or updated version of the platform, stores the key therein as contents (e.g., in the newly instantiated version of memory 214).

In block 408, the platform processor is capable of encrypting the modified configuration bitstream using the key resulting in an encrypted configuration bitstream. In one aspect, the platform processor is capable of encrypting the modified, encrypted configuration bitstream. In another aspect, the platform processor invokes the encryption engine to perform the encryption. In block 410, the programmable IC stores the encrypted configuration bitstream in a boot memory for the programmable IC. For example, the platform processor is capable of storing the encrypted configuration bitstream within non-volatile memory 136 via controller 216. The encrypted configuration bitstream may be stored at a location in non-volatile memory 136 that is used, known, and/or reserved for storing firmware for programmable IC 132 written by the platform processor.

In one aspect, configuration bitstreams, which may also include user specified circuitry, may be split into two or more different configuration bitstreams. In that case, the first configuration bitstream loaded into the programmable IC would include the platform (e.g., may only include the platform) since the platform processor is used to authenticate any subsequently loaded configuration bitstreams (e.g., that may implement user specified circuitry) for securely booting the programmable IC.

Figure 5:
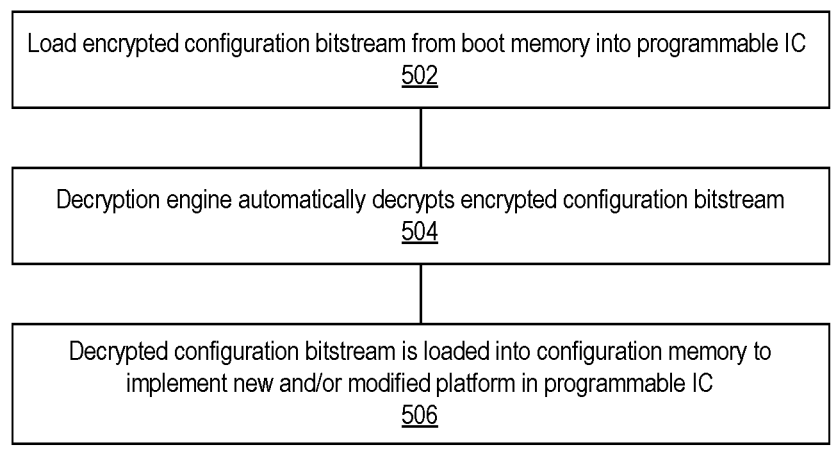
FIG. 5 illustrates an example method of loading updated firmware within a programmable IC.

FIG. 5 illustrates an example method 500 of loading updated firmware within programmable IC 132. As discussed, the firmware is a trusted configuration bitstream that is loaded into programmable IC 132 to implement a platform therein. In the example of FIG. 5, the encrypted configuration bitstream is one generated using the processes described herein in connection with FIGS. 1-4 and is an example of firmware for programmable IC 132. It should be appreciated that since the built in RSA authentication circuitry of programmable IC 132 is not used, features such as tandem boot (if the platform is stored in this manner), configuration bitstream compression, and partial reconfiguration of programmable IC 132 may be used.

In the example of FIG. 5, the programmable IC 132 may be given an instruction to reboot from host computer 102, may be restarted and/or power-cycled, or otherwise placed in an operating state where programmable IC 132 must load or reload firmware. In doing so, the existing platform implemented within programmable IC 132 is erased.

In block 502, the encrypted configuration bitstream is loaded from the boot memory into programmable IC 132. Programmable IC 132, for example, is capable of loading the encrypted configuration bitstream from non-volatile memory 136. In one aspect, programmable IC 132 may include a configuration engine (e.g., as built in or hardwired circuitry or logic) that is capable of automatically accessing non-volatile memory 136 responsive to power-on or reset and loading the encrypted configuration bitstream (e.g., firmware) therefrom into programmable IC 132. In an operating state where programmable IC 132 has been restarted, for example, platform 140 no longer exists therein.

In block 504, decryption engine 218 automatically decrypts the encrypted configuration bitstream loaded by the configuration engine. As discussed, decryption engine 218 is permitted to read the key from the permanent memory. Memory 214, for example, no longer exists in programmable IC 132 in consequence of the firmware update process. Decryption engine 218 decrypts the encrypted configuration bitstream using the key read from the permanent memory.

In block 506, the decrypted configuration bitstream is loaded, e.g., by the configuration engine, into configuration memory of programmable IC 132. Loading the decrypted configuration bitstream into programmable IC 132 implements the platform defined by the decrypted configuration bitstream within the programmable circuitry of programmable IC 132. The platform will include communication bus interface 202, platform processor 210, processor memory 212 storing trusted program code for execution by platform processor 210, memory 214 storing the key, controller 216, and optionally secure IPC circuit 208. Any modifications to such components and/or modifications to the program code executed by platform processor 210 are specified by the decrypted configuration bitstream.

As discussed, with the platform implemented in the programmable IC, the platform processor is capable of authenticating and loading any further configuration bitstream to be loaded into the programmable IC. In one aspect, the platform processor, may provide any such configuration bitstreams to an Internal Configuration Access Port (not shown) that is capable of loading the configuration bitstreams into internal configuration memory of the programmable IC.

Figure 6:
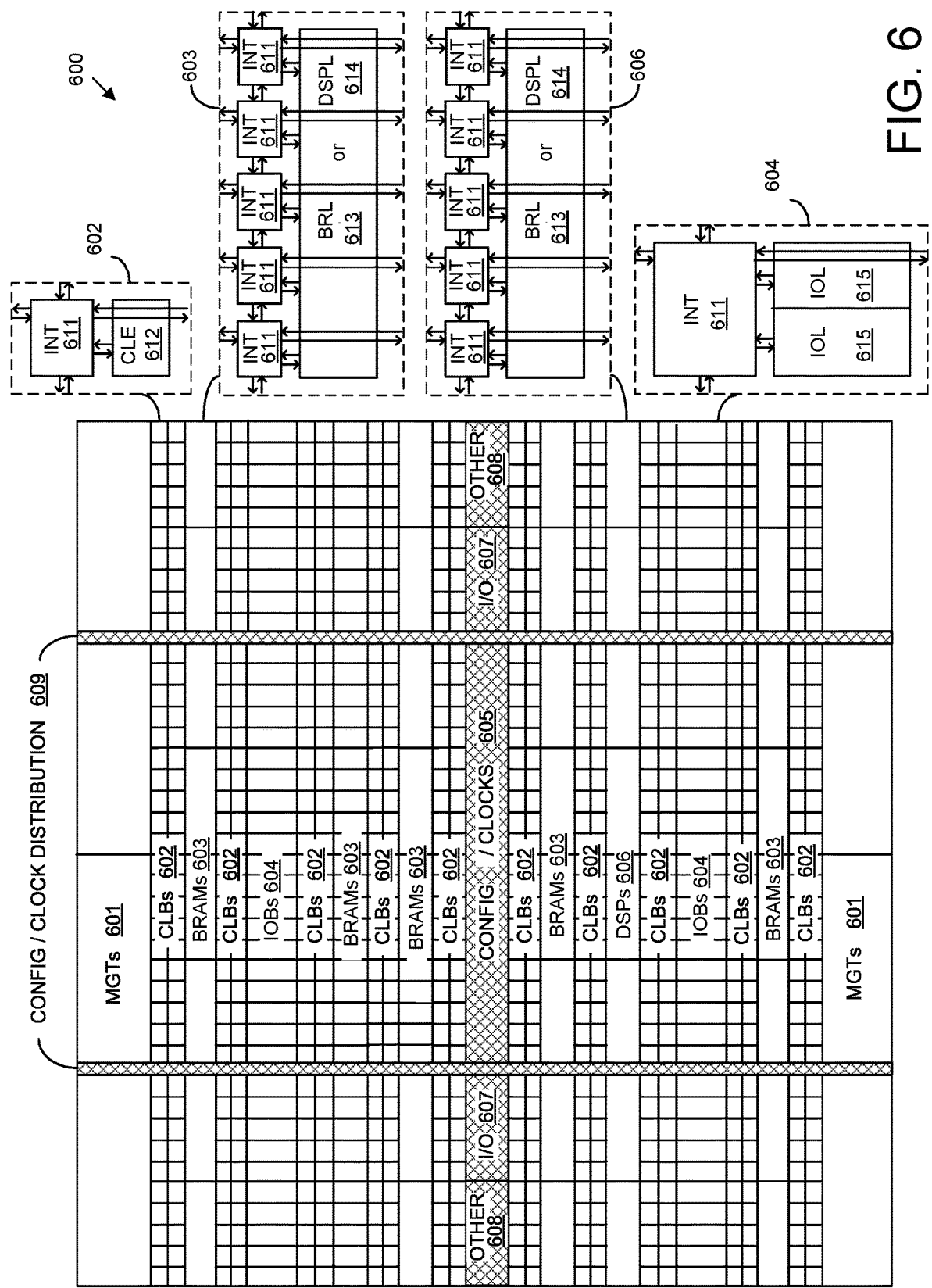
FIG. 6 illustrates an example architecture for a programmable IC.

FIG. 6 illustrates an example architecture 600 for a programmable IC. For example, architecture 600 may be used to implement an FPGA. As shown, architecture 600 includes several different types of programmable circuit, e.g., logic, blocks. For example, architecture 600 may include a large number of different programmable tiles including multi-gigabit transceivers (MGTs) 601, configurable logic blocks (CLBs) 602, random access memory blocks (BRAMs) 603, input/output blocks (IOBs) 604, configuration and clocking logic (CONFIG/CLOCKS) 605, digital signal processing blocks (DSPs) 606, specialized I/O blocks 607 (e.g., configuration ports and clock ports), and other programmable logic 608 such as digital clock managers, analog-to-digital converters, system monitoring logic, and so forth.

In some ICs, each programmable tile includes a programmable interconnect element (INT) 611 having standardized connections to and from a corresponding INT 611 in each adjacent tile. Therefore, INTs 611, taken together, implement the programmable interconnect structure for the illustrated IC. Each INT 611 also includes the connections to and from the programmable logic element within the same tile, as shown by the examples included at the right of FIG. 6.

For example, a CLB 602 may include a configurable logic element (CLE) 612 that may be programmed to implement user logic plus a single INT 611. A BRAM 603 may include a BRAM logic element (BRL) 613 in addition to one or more INTs 611. Typically, the number of INTs 611 included in a tile depends on the height of the tile. As pictured, a BRAM tile has the same height as five CLBs, but other numbers (e.g., four) also may be used. A DSP tile 606 may include a DSP logic element (DSPL) 614 in addition to an appropriate number of INTs 611. An IOB 604 may include, for example, two instances of an I/O logic element (IOL) 615 in addition to one instance of an INT 611. The actual I/O pads connected to IOL 615 may not be confined to the area of IOL 615.

In the example pictured in FIG. 6, a horizontal area near the center of the die, e.g., formed of regions 605, 607, and 608, may be used for configuration, clock, and other control logic. Vertical areas 609 extending from this horizontal area may be used to distribute the clocks and configuration signals across the breadth of the programmable IC.

Some ICs utilizing the architecture illustrated in FIG. 6 include additional logic blocks that disrupt the regular columnar structure making up a large part of the IC. The additional logic blocks may be programmable blocks and/or dedicated (e.g., hardwired) circuitry.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, CLBs 602 and BRAMs 603 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

The configuration bitstream may specify the circuitry that is to be implemented within the programmable circuitry and any program code that is to be executed by a soft processor implemented therein. In some cases, architecture 600 includes a dedicated configuration processor (e.g., the configuration engine and/or ICAP) that loads the configuration bitstream to the appropriate configuration memory and/or processor memory. The dedicated configuration processor does not execute user-specified program code and is not accessible by user designs.

FIG. 6 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 6 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks within the IC are for purposes of illustration only and are not intended as limitations.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one circuit capable of carrying out instructions contained in program code. The circuit may be an integrated circuit or embedded in an integrated circuit.

As defined herein, the term "soft" in reference to a circuit means that the circuit is implemented in programmable logic or programmable circuitry. Thus, a "soft processor" means at least one circuit implemented in programmable circuitry that is capable of carrying out instructions contained in program code.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

A method can include receiving, within a programmable IC, a configuration bitstream, inserting, using a processor of the programmable IC, a key into the configuration bitstream resulting in a modified configuration bitstream, encrypting, using the programmable IC, the modified configuration bitstream using the key resulting in an encrypted configuration bitstream, and storing the encrypted configuration bitstream in a boot memory for the programmable IC.

The foregoing and other implementations can each optionally include one or more of the following features, alone or in combination. In particular, one implementation includes all the following features in combination.

In another aspect, the processor is a soft-processor implemented in programmable circuitry of the programmable IC. The processor performs the encrypting using the key.

In another aspect, the processor is coupled to a BRAM. The BRAM stores the key, is only readable by the processor, and the processor obtains the key from the BRAM.

In another aspect, the key is a unique symmetric key also stored in a permanent memory of the programmable IC. The permanent memory is not readable by the processor.

In another aspect, the processor of the programmable IC is implemented by a trusted configuration bitstream and executes trusted program code.

In another aspect, the configuration bitstream has a certificate. The method can include first validating, using the processor, the configuration bitstream based on the certificate.

In another aspect, the method can include loading the encrypted configuration bitstream into the programmable IC, decrypting the encrypted configuration bitstream within the programmable IC resulting in a decrypted configuration bitstream, and configuring programmable circuitry of the programmable IC using the decrypted configuration bitstream. The decrypting may be performed by a decryption engine within the programmable IC. The decryption engine can obtain the key from a permanent memory storing the key. The permanent memory is not readable by the processor.

In another aspect, upon configuring the programmable circuitry, the key is stored in a memory of the programmable IC. The memory corresponds to an insertion point of the key within the configuration bitstream.

In another aspect, the encrypting is performed by at least one of the processor or an encryption engine.

In another aspect, the key is inserted into the configuration bitstream by modifying a BRAM of the programmable IC to store the key. The BRAM is only readable by the processor.

An IC can include a communication bus interface configured to receive a configuration bitstream, a processor configured insert a key into the configuration bitstream resulting in a modified configuration bitstream and encrypt the modified configuration bitstream using the key resulting in an encrypted configuration bitstream, and a memory controller configured to store the encrypted configuration bitstream in a boot memory for the IC.

The foregoing and other implementations can each optionally include one or more of the following features, alone or in combination. In particular, one implementation includes all the following features in combination.

In another aspect, the processor is a soft-processor implemented in programmable circuitry of the IC.

In another aspect, the processor is coupled to a BRAM. The BRAM stores the key, is only readable by the processor, and the processor obtains the key from the BRAM.

In another aspect, the key is a unique symmetric key also stored in a permanent memory of the IC. The permanent memory is not readable by the processor.

In another aspect, the processor of the IC is implemented by a trusted configuration bitstream and executes trusted program code.

In another aspect, the configuration bitstream has a certificate. The processor is further configured to first validate the configuration bitstream based on the certificate.

In another aspect, the IC includes a decryption engine. The memory controller may be configured to load the encrypted configuration bitstream into the IC, the decryption engine is configured to decrypt the encrypted configuration bitstream within the IC resulting in a decrypted configuration bitstream, and the programmable circuitry of the IC is configured using the decrypted configuration bitstream. The decryption engine obtains the key from a permanent memory storing the key. The permanent memory is not readable by the processor.

In another aspect, upon configuring the programmable circuitry, the key is stored in a memory of the IC. The memory corresponds to an insertion point of the key within the configuration bitstream.

In another aspect, the processor invokes an encryption engine included in the IC to encrypt the configuration bitstream.

In another aspect, the key is inserted into the configuration bitstream by modifying a BRAM of the IC to store the key. The BRAM is only readable by the processor.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
receiving, within a programmable integrated circuit, a configuration bitstream;
inserting, using a processor of the programmable integrated circuit, a key into the configuration bitstream resulting in a modified configuration bitstream;
encrypting, using the programmable integrated circuit, the modified configuration bitstream using the key resulting in an encrypted configuration bitstream;
storing the encrypted configuration bitstream in a boot memory for the programmable integrated circuit;
wherein the processor is a soft-processor implemented in programmable circuitry of the programmable integrated circuit, and wherein the processor performs the encrypting using the key or controls an encryption engine that performs the encryption using the key;
wherein the processor is coupled to a block random access memory, the block random access memory stores the key, is only readable by the processor, and the processor obtains the key from the block random access memory; and
wherein the key is a unique symmetric key stored in a permanent memory of the programmable integrated circuit, wherein the permanent memory is not readable by the processor.

2. The method of claim 1, wherein the processor of the programmable integrated circuit is implemented by a trusted configuration bitstream and executes trusted program code.

3. The method of claim 1, wherein the configuration bitstream has a certificate, the method further comprising:
first validating, using the processor, the configuration bitstream based on the certificate.

4. The method of claim 1, further comprising:
loading the encrypted configuration bitstream into the programmable integrated circuit;
decrypting the encrypted configuration bitstream within the programmable integrated circuit resulting in a decrypted configuration bitstream;
configuring programmable circuitry of the programmable integrated circuit using the decrypted configuration bitstream; and
wherein the decrypting is performed by a decryption engine within the programmable integrated circuit, wherein the decryption engine obtains the key from the permanent memory.

5. The method of claim 4, wherein, upon configuring the programmable circuitry, the key is stored in the block random access memory of the programmable integrated circuit, wherein the block random access memory corresponds to an insertion point of the key within the configuration bitstream.

6. The method of claim 1, wherein the key is inserted into the configuration bitstream by modifying the block random access memory of the programmable integrated circuit to store the key.

7. An integrated circuit, comprising:
a communication bus interface configured to receive a configuration bitstream;
a processor configured insert a key into the configuration bitstream resulting in a modified configuration bitstream;
wherein the processor is a soft-processor implemented in programmable circuitry of the integrated circuit, and wherein the processor or an encryption engine controlled by the processor encrypts the modified configuration bitstream using the key resulting in an encrypted configuration bitstream;
a memory controller configured to store the encrypted configuration bitstream in a boot memory for the integrated circuit;
wherein the processor is coupled to a block random access memory, the block random access memory stores the key, is only readable by the processor, and the processor obtains the key from the block random access memory; and
wherein the key is a unique symmetric key stored in a permanent memory of the integrated circuit, wherein the permanent memory is not readable by the processor.

8. The integrated circuit of claim 7, wherein the processor of the integrated circuit is implemented by a trusted configuration bitstream and executes trusted program code.

9. The integrated circuit of claim 7, wherein the configuration bitstream has a certificate, wherein the processor is further configured to first validate the configuration bitstream based on the certificate.

10. The integrated circuit of claim 7, further comprising a decryption engine, wherein:
the memory controller is configured to load the encrypted configuration bitstream into the integrated circuit;
the decryption engine is configured to decrypt the encrypted configuration bitstream within the integrated circuit resulting in a decrypted configuration bitstream;
programmable circuitry of the integrated circuit is configured using the decrypted configuration bitstream; and
the decryption engine obtains the key from the permanent memory.

11. The integrated circuit of claim 10, wherein, upon configuring the programmable circuitry, the key is stored in the block random access memory of the integrated circuit, wherein the block random access memory corresponds to an insertion point of the key within the configuration bitstream.

12. The integrated circuit of claim 7, wherein the key is inserted into the configuration bitstream by modifying the block random access memory of the integrated circuit to store the key.

* * * * *